(12) United States Patent
Bringley et al.

(10) Patent No.: US 8,287,952 B2
(45) Date of Patent: Oct. 16, 2012

(54) COLLOIDAL CORE-SHELL ASSEMBLIES AND METHODS OF PREPARATION

(75) Inventors: Joseph F. Bringley, Rochester, NY (US); Tiecheng A. Qiao, Webster, NY (US); David L. Patton, Webster, NY (US)

(73) Assignee: Carestream Health, Inc., Rochester, NY (US)

( * ) Notice: Subject to any disclaimer, the term of this patent is extended or adjusted under 35 U.S.C. 154(b) by 1894 days.

(21) Appl. No.: 11/036,752

(22) Filed: Jan. 14, 2005

(65) Prior Publication Data

US 2005/0186337 A1    Aug. 25, 2005

Related U.S. Application Data

(63) Continuation-in-part of application No. 10/622,354, filed on Jul. 18, 2003, now abandoned.

(51) Int. Cl.
*B05D 7/00* (2006.01)
*B05D 3/10* (2006.01)
*A61K 9/14* (2006.01)

(52) U.S. Cl. ........... 427/221; 427/220; 516/78; 424/489

(58) Field of Classification Search .................... 516/78; 427/220, 221; 424/489
See application file for complete search history.

(56) References Cited

U.S. PATENT DOCUMENTS

| | | | |
|---|---|---|---|
| 3,007,878 A | | 11/1961 | Alexander et al. |
| 3,796,634 A | * | 3/1974 | Haynes et al. ............... 435/180 |
| 4,280,918 A | | 7/1981 | Homola et al. |
| 4,904,411 A | * | 2/1990 | Novich et al. ............... 516/33 |
| 5,217,804 A | | 6/1993 | James et al. |
| 5,403,750 A | * | 4/1995 | Braatz et al. ............... 427/221 |
| 6,207,134 B1 | | 3/2001 | Fahlvik et al. |
| 6,417,264 B1 | | 7/2002 | Kono et al. |
| 6,720,007 B2 | * | 4/2004 | Walt et al. ............... 424/489 |
| 7,541,017 B2 | * | 6/2009 | Bringley et al. ............... 516/78 |
| 2003/0196692 A1 | | 10/2003 | Koyanagi et al. |

FOREIGN PATENT DOCUMENTS

| | | |
|---|---|---|
| EP | 0 681 992 | 11/1995 |
| EP | 1 277 766 | 1/2003 |
| EP | 1 375 177 | 1/2004 |

OTHER PUBLICATIONS

M. Brinkley, "A Brief Survey of Methods for Preparing Protein Conjugates with Dyes, Haptens, and Cross-Linking Reagents", Bioconjugate Chem. 3, 2 (1992).*
*Journal of American Chemical Society*, 1998, vol. 120, pp. 8523-8524.
G. T. Hermanson, *Bioconjugate Techniques*, , Academic Press, San Diego, CA (1996), Title&Bib pages.
Burke and Barrett, *Langmuir*, 2003, vol. 19, pp. 3297-3303.

* cited by examiner

*Primary Examiner* — Daniel S Metzmaier

(57) ABSTRACT

This invention relates to a method of making a composition comprising a colloid comprising particles having a colloidal silica core and a shell, said method comprising the steps of:
  simultaneously introducing into a vessel a first liquid stream containing silica core particles, a second liquid stream containing a polymer having amine functionalities; and
  a third liquid stream having a pH adjusting substance such that said vessel is maintained at a pH below 6.0, and
  followed by readjusting the pH of the colloid to a pH between about 7-10; the addition of a cross-linking reagent, and adjusting the pH of the colloid to approximately physiological conditions, wherein the core-shell colloid contains between 10 and 30 µmol amine-monomer/$m^2$ core surface area.

11 Claims, No Drawings

COLLOIDAL CORE-SHELL ASSEMBLIES AND METHODS OF PREPARATION

CROSS-REFERENCE TO RELATED APPLICATIONS

This is a continuation-in-part application of U.S. application Ser. No. 10/622,354 filed Jul. 18, 2003, abandoned, published as U.S. Publication 2005/0014851 A1 and entitled "COLLOIDAL CORE-SHELL ASSEMBLIES AND METHODS OF PREPARATION" by Joseph F. Bringley.

FIELD OF THE INVENTION

The invention relates to colloidal dispersions comprising core-shell particles and to methods of forming colloidal core-shell dispersions. The invention further relates to colloids containing polymer-modified core-shell colloids and to methods of their formation. More particularly, there are described colloids containing core-shell nanoparticulate carrier particles wherein the shell contains a polymer having amine functionalities. The described core-shell colloids are stable under physiological conditions.

BACKGROUND OF THE INVENTION

The ordered assembly of nanoscale and molecular components has promise to create molecular-assemblies capable of mimicking biological function, and capable of interacting with living cells and cellular components. Many techniques for creating nanoscale assemblies are being developed and include small-molecule assembly, polyelectrolyte assembly, nanoscale precipitation, core-shell assemblies, heterogeneous precipitation, and many others. However, a significant challenge lies in creating methods for assembling or fashioning nanoparticles, or molecules, into materials capable of being fabricated into free-standing, stable, working "devices". While much progress has been made regarding two-dimensional (or layered) molecular assemblies, discrete three-dimensional assemblies of nanoparticles or molecules are generally much more difficult to fabricate and far fewer examples and methodologies have been reported. Three-dimensional nanoscale assemblies often suffer from instabilities, and resist integration into working systems. A simple example involves integration of nanoscale assemblies into living organisms. Successful integration requires assemblies which are colloidally stable under highly specific conditions (physiological pH and ionic strength), are compatible with blood components, are capable of avoiding detection by the immune system, and may survive the multiple filtration and waste removal systems inherent to living organisms. Highly precise methods of assembly are necessary for building ordered nanoscale assemblies capable of performing under stringent conditions.

More recently, there has been intense interest focused upon developing surface-modified nanoparticulate materials that are capable of carrying biological, pharmaceutical or diagnostic components. The components, which might include drugs, therapeutics, diagnostics, and targeting moieties can then be delivered directly to diseased tissue or bones and be released in close proximity to the disease and reduce the risk of side effects to the patient. This approach has promised to significantly improve the treatment of cancers and other life threatening diseases and may revolutionize their clinical diagnosis and treatment. The components that may be carried by the nanoparticles can be attached to the nanoparticle by well-known bio-conjugation techniques; discussed at length in Bioconjugate Techniques, G. T. Hermanson, Academic Press, San Diego, Calif. (1996). The most common bio-conjugation technique involves conjugation, or linking, to an amine functionality. Amines are abundant on many synthetic and biological molecules or polymers. Polymers having amine functionalities are often referred to as polyamines, and represent a subset of a larger class of polymers called polyelectrolytes.

Many authors have described the difficulty of making stable dispersions of colloids having surface modified particles, often referred to as core-shell particles. Achieving colloidal stability under physiological conditions (pH 7.4 and 137 mM NaCl) is yet even more difficult. Burke and Barret (Langmuir, 19, 3297(2003)) describe the adsorption of the amine-containing polyelectrolyte, polyallylamine hydrochloride, onto 70-100 nm silica particles in the presence of salt. The authors state (p. 3299) "the concentration of NaCl in the colloidal solutions was maintained at 1.0 mM because higher salt concentrations lead to flocculation of the colloidal suspension".

Caruso et al. (J. Amer. Chem Soc. 120, 8523 (1998)) describe a method for preparing nanoparticle-shell multilayers upon larger polystyrene core-particles. A layer-by-layer technique is described in which oppositely charged nanoparticles or polymeric species are sequentially absorbed to the core particle. The technique requires that the core particles be added to a large excess of the shelling polymer or particles and that the unabsorbed fraction (or excess) be removed by repeated centrifugation and wash cycles. Only then is a second shell-layer applied and centrifugation and washing repeated. This method is tedious, requires considerable time and is typically only applicable to dilute (<5 wt %) systems. In general, previous methods of forming core-shell colloids require purification methods to remove unshelled core particles, or to remove shell materials unassociated (not bound) to the core particles. These methods are time consuming and are not cost effective.

U.S. Pat. No. 6,207,134 B1 describes particulate diagnostic contrast agents comprising magnetic or supermagnetic metal oxides and a polyionic coating agent. The coating agent can include "physiologically tolerable polymers" including amine-containing polymers. The contrast agents are said to have "improved stability and toxicity compared to the conventional particles" (col. 6, line 11-13). The authors state (Col. 4, line 15-16) that "not all the coating agent is deposited, it may be necessary to use 1.5-7, generally about two-fold excess . . . " of the coating agent. The authors further show that only a small fraction of polymer adsorbs to the particles. For example, from FIG. 1 of '134, at 0.5 mg/mL polymer added only about 0.15 mg/mL adsorbs, or about 30%. The surface-modified particles of '134 are made by a conventional method involving simple mixing, sonication, centrifugation and filtration. There is a problem in that this leads to a very small amount of active amine groups on the surface of the particle, and hence a very low useful biological, pharmaceutical or diagnostic components capacity for the described carrier particles in the colloids. There is an additional problem in that polymer not adsorbed to the particle surfaces may interfere with subsequent attachment or conjugation, of biological, pharmaceutical or diagnostic components.

It would be desirable to produce nanoparticle carriers for bioconjugation and targeted delivery that are stable colloids so that they can be injected in vivo, especially intravascularly. Further, it is desirable that the nanoparticle carriers be stable under physiological conditions (pH 7.4 and 137 mM NaCl). It is desirable to minimize the number of amine groups not adsorbed to the nanoparticle and limit "free" amine-functionalities in solution, since the free amines may interfere with the function of the nanoparticle assembly.

PROBLEM TO BE SOLVED BY THE INVENTION

There remains a need for colloids comprising core-shell carrier particles that are stable over useful periods of time, that are stable in physiological conditions, and that may be pH adjusted to effect the bioconjugation of biological, pharmaceutical or diagnostic components. There remains a need for methods for manufacturing colloids comprising core-shell carrier particles that provide stable colloids having high concentrations (5-50% solids). There is a further need for such colloids that can be made at high production rates and low cost. There is a further need for improved methods of obtaining well-ordered, homogeneous colloids comprising core-shell carrier particles in which substantially all of the carrier particles in the colloid are surface-modified with an amine containing polymer shell, and the colloid is substantially free of unmodified colloid particles, and is substantially free of amine functionalities that are unattached to the colloids.

SUMMARY OF THE INVENTION

It is an object of the invention to provide methods for manufacturing colloids comprising core-shell carrier particles that provide stable colloids having high concentrations (5-50% solids). It is an object of the invention to provide methods for preparing such colloids at high production rates and low cost. It is a further object of the invention to provide methods of obtaining well-ordered, homogeneous colloids comprising core-shell carrier particles in which substantially all of the carrier particles in the colloid are surface-modified with an amine containing polymer shell, and the colloid is substantially free of unmodified colloid particles, and is substantially free of amine functionalities that are unattached to the colloids.

The invention provides a method of making a composition comprising the steps of:
  introducing into a vessel a first liquid stream containing core particles;
  simultaneously introducing into said vessel a second liquid stream containing a polymer having amine functionalities in an amount at least equal to the amount required to cover the surfaces of the core particles; and
  simultaneously introducing into said vessel a third liquid stream having a pH adjusting substance at such a rate that the pH in said vessel is maintained at a pH at which the core-shell colloid formed by said first and second liquid streams is a stable colloid.

In another embodiment the invention provides a method of making a composition comprising a colloid which is stable under physiological pH and ionic strength, said colloid comprising particles having a core and a shell, said method comprising the steps of:
  introducing into a vessel a first liquid stream containing core particles;
  simultaneously introducing into said vessel a second liquid stream containing a polymer having amine functionalities in an amount at least equal to the amount required to cover the surfaces of the core particles; and
  simultaneously introducing into said vessel a third liquid stream having a pH adjusting substance at such a rate that the pH in said vessel is maintained at a pH below 6.0, and subsequently readjusting the pH of the core-shell colloid to a pH between about 7-10; followed by the addition of a cross-linking reagant capable of cross-linking the polymer; and finally adjusting the pH of the colloid to approximately physiological conditions.

DETAILED DESCRIPTION OF THE INVENTION

The invention has numerous advantages, providing core-shell colloids at a high production rate and at a low cost, and readily provides stable dispersions of said core-shell particles. The method of the invention provides well-ordered, homogeneous colloids comprising core-shell carrier particles in which substantially all of the carrier particles in the colloid are surface-modified with an amine containing polymer shell, and the colloid is substantially free of unmodified colloid particles, and is substantially free of amine functionalities that are unattached to the colloids.

Colloidal particles find use in a broad variety applications such as pigments for paints, as thickeners and coating aids, in cosmetic products, in paper products, as polishing media in semiconductor electronics, to name only a few. More recently, there has been intense interest focused upon developing surface-modified nanoparticulate materials that are capable of carrying biological, pharmaceutical or diagnostic components. The components, which might include drugs, therapeutics, diagnostics, and targeting moieties can then be delivered directly to diseased tissue or bones and be released in close proximity to the disease and reduce the risk of side effects to the patient. This approach has promised to significantly improve the treatment of cancers and other life threatening diseases and may revolutionize their clinical diagnosis and treatment. It is desired that the core-shell colloid be inexpensive, homogeneous and colloidally stable to facilitate its integration and application in products, devices and treatments.

The method of the invention provides a composition comprising core-shell colloids that are stable colloids. A colloid consists of a mixture of small solid particulates in a liquid, such as water (a colloid is also sometimes referred to as a suspension or dispersion). The colloid is said to be stable if the solid particulates do not aggregate (as determined by particle size measurement) and settle from the colloid, usually for a period of hours, preferably weeks to months. Terms describing colloidal instability include aggregation, agglomeration, flocculation, gelation and settling. Significant growth of mean particle size to diameters greater than about three times the core diameter, and visible settling of the colloid within one day of its preparation is indicative of an unstable colloid.

It is often the surface properties of the particles in the colloid, such as their electrostatic charge, which contribute to the stability of the colloid. Typically the surfaces are significantly charged, positive or negative, so as to provide electrostatic repulsion to overcome forces which would otherwise lead to the aggregation and settling of the particles from the colloid. It has been of interest to surface modify particles, or to "assemble" colloidal particles of opposite charge to achieve specific properties. However, this is often difficult since the surface modification or assembly disrupts the electrostatic and steric forces necessary for colloidal stability; and stable colloids are not easily obtained. The composition provided by the method of the invention is a stable colloid and hence should remain in suspension for a period of greater than a few hours, and more preferably greater than a few days; and most preferably greater than a few weeks. The zeta potential of the colloid can have a maximum value greater than about ±20 mV, and more preferably greater than about ±30 mV. A high zeta potential is preferred because it increases the stability of the colloid. Colloidal stability and zeta potential of a colloid are closely related to the pH of the medium in which the colloid is dispersed.

In practice of the method of the invention, the pH may be adjusted as is necessary to provide a stable colloid. It is preferred that in carrying out the method the pH is controlled to be below 6.0. This is preferred because it provides stable polyamine-modified, core-shell colloids. After assembly, the pH of the colloid may be adjusted to a desired pH. The pH of the colloid can be between about pH 4 and pH 10 and more preferably between about pH 5 and pH 9. It is preferred that the core-shell colloid obtained from the method is stable under physiological conditions (e.g. pH 7.4, 137 mM NaCl), or in buffers or saline solutions typically used in in vivo applications, especially in compositions used for intravascular injections. It is preferred that the core-shell colloid obtained from the method of the invention is stable in salt concentrations of about 30 mM to about 600 mM. This is preferred because the core-shell colloid can then remain stable when introduced into, or diluted by, such solutions. Physiological pH and ionic strength may vary from about pH 6 to about pH 8, and salt concentrations of about 30 mM to about 600 mM and the method provides core-shell colloids that are stable under any combination within these ranges.

Core particle materials may be selected from inorganic materials such as metals, metal oxides, metal oxyhydroxides and insoluble salts; and from organic particulates such as latexes, polystyrene, and insoluble polymers. It is preferred that the core particles are negatively charged and hence have a negative zeta pontential. This is preferred because polyamines adsorb more strongly to negatively charged surfaces. Preferred core particle materials are inorganic colloidal particles, such as alumina, silica, boehmite, zinc oxide, calcium carbonate, titanium dioxide, and zirconia. These materials are preferred because of their low cost and general availability. Preferred organic core particle materials are selected from aqueous latexes and polystyrene. In a particularly preferred embodiment of the invention the core particles are silica or aqueous latex particles. Silica particles are preferred because they are readily available in a range of sizes and they are low-cost. It is preferred that the core particles have an average particle size diameter between about 1 and 500 nm, and more preferably between about 10 and 100 nm. These particle size diameters are preferred because they are the appropriate sizes for biological applications.

The particle size(s) of the particles in the core-shell colloid may be characterized by a number of methods, or combination of methods, including coulter methods, light-scattering methods, sedimentation methods, optical microscopy and electron microscopy. The particles in the examples were characterized using light-scattering methods. Light-scattering methods may sample $10^9$ or more particles and are capable of giving excellent colloidal particle statistics. Light-scattering methods may be used to give the percentage of particles existing within a given interval of diameter or size, for example, 90% of the particles are below a given value. Light-scattering methods can be used to obtain information regarding mean particle size diameter, the mean number distribution of particles, the mean volume distribution of particles, standard deviation of the distribution(s) and the distribution width for nanoparticulate particles. In the present core-shell particles, which can be used as carrier particles, it is preferred that at least 90% of the particles be less than 4-times the mean particle size diameter, and more preferably that at least 90% of the particles are less than 3-times the mean particle size diameter. The mean particle size diameter may be determined as the number weighted (mean size of the total number of particles) or as the area, volume or mass weighted mean. It is preferred that the volume or mass weighted mean particle size diameter be determined, since larger particles having a much greater mass are more prominently counted using this technique. In addition, a narrow size-frequency distribution for the particles may be obtained. A measure of the volume-weighted size-frequency distribution is given by the standard deviation (sigma) of the measured particle sizes. It is preferred that the standard deviation of the volume-weighted mean particle size diameter distribution is less than the mean particle size diameter, and more preferably less than one-half of the mean particle size diameter. This describes a particle size distribution that is desirable for injectable compositions.

The composition provided by the method of the invention comprises a shell polymer having amine functionalities. The amine functionalities serve at least two purposes. First, they provide attachment sites for "linking" the polymer to the core surface. Linking can occur through electrostatic attraction of a polyamine to negatively charged surfaces, since the amine may be positively charged through protonation of the amine functionalities. Linking can also occur by hydrogen bonding of the polyamine to the particle surfaces. Preferred polymers having amine functionalities are poly(ethylene)imine, polyallylamine, chitosan, gelatin, proteins, polypeptides, aminodextran, jeffamine and polylysine. These are preferred because they may have a high-density of amine functionalities and can be bio-compatible. It is preferred that greater than 70% of said polymer having amine functionalities present in the colloid is bound to said core. This is preferred because it obviates washing, filtration and purification steps which are time consuming and costly.

In practice of the invention, the core particles and a polymer having amine functionalities are simultaneously brought together in an amount at least equal to the amount required to cover the surfaces of the core particles. This is because when there is insufficient coverage, stable core-shell colloids are not obtained. It is furthermore preferred that the shell material should not be supplied into the mixing zone in a very large excess of that required to substantially cover all the surfaces of said core particles. In this case, excess shell materials are not strongly bound by the core particles but remain in solution. Unbound polyamine is undesired since it may have properties distinct from the core-shell particles; and purification and separation of the free polyamine from the core-shell colloid may be difficult. Generally, an amount at least equal to the amount of polyamine required to cover the surfaces of the core particles is provided by a concentration of polyamine greater than about 4 µmol amine-monomer/$m^2$ core surface area. This quantity can easily be calculated by those experienced in the art and is given by the expression: [(g polyamine×$10^6$)/(($M_w$ polymer×($M_w$ monomer/$M_w$ polymer)]/[g core-particles×specific surface area]>4; where $M_w$ is the molecular weight, g is weight in grams and the specific surface area of the core particles in g/$m^2$. It is preferred that the core-shell colloid provided by the method of the invention contains between 10 and 30 µmol amine-monomer/$m^2$ core surface area. It is further preferred that the core-shell colloid contains between 300 and 6000 µmol amine-monomer/g core particles. This is preferred because it provides a core-shell colloid having a useful biological, pharmaceutical or diagnostic components capacity for the described carrier particle applications, and because it provides core-shell colloids whose pH can be adjusted over a broad range while maintaining colloidal stability.

It is preferred that the polymer is permanently attached to the surface of a particle and does not de-adsorb when the pH is changed or the ionic strength (salt concentration) is changed. It is further preferred that the polymer having amine functionalities is cross-linked. Cross-linking is preferred because it helps to prevent de-adsorption of the polymer having amine functionalities from the particle surfaces. The amount of cross-linking reagent should be minimized, and it is preferred that only enough necessary to prevent de-adsorption be used. The molar ratio of cross-linking reagents to polymers should be between about 1:1 and about 25:1. Cross-linking reagents that can be used are described in M. Brinkley, Bioconjugate Chem. 3, 2 (1992) and in "Chemistry of Protein Conjugation and Cross-linking", S. S. Wong, CRC Press (1991). The cross-linking reagent may be added during or after carrying out the processing steps of the method. It is preferred that the cross-linker is simultaneously added with said first, second and third stream.

In a preferred embodiment of the invention, the first, second and third liquid streams are brought together simultaneously into a high shear mixing zone within a dispersion medium. The high shear mixing zone may be provided by a propeller-like mixer, a static mixer, in-line mixers, dispersators, or other high shear mixing apparatus. The mixing efficiency of the apparatus is dependent upon the type of mixing method chosen and the precise geometry and design of the mixer. For propeller-like mixers the mixing efficiency may be approximated by the turnover rate, where the turnover rate is the stir rate (rev/sec.) times the turnover volume (ml/rev)) divided by the aqueous volume. For in-line or static mixers, the mixing efficiency may be approximated by multiplying the sum of the addition rates of the colloidal dispersions by the turnover volume of the mixer. In each case, the mixing efficiency has units of turnovers/sec. It is preferred that the mixing efficiency be greater than about 0.10 turnovers/sec. and more preferably greater than 1 turnover/sec. Complete mixing of the two particle dispersion streams is preferably accomplished in less than about 10 seconds; and is more preferably accomplished substantially instantaneously. High turnover rates and fast mixing are preferred because they result in more complete shelling and more stable core-shell colloids.

The invention provides a method of making a composition comprising a colloid which is stable under physiological pH and ionic strength, said colloid comprising particles having a core and a shell, said method comprising the steps of:
  introducing into a vessel a first liquid stream containing core particles;
  simultaneously introducing into said vessel a second liquid stream containing a polymer having amine functionalities in an amount at least equal to the amount required to cover the surfaces of the core particles; and
  simultaneously introducing into said vessel a third liquid stream having a pH adjusting substance at such a rate that the pH in said vessel is maintained at a pH below 6.0, and
  subsequently readjusting the pH of the core-shell colloid to a pH between about 7-10; followed by the addition of a cross-linking reagant capable of cross-linking the polymer; and finally adjusting the pH of the colloid to approximately physiological conditions.

It is preferred that after formation of the core-shell colloid, a subsequent processing step is performed that involves readjusting the pH of the core-shell colloid to a pH between about 7-10; followed by the addition of a cross-linking reagant capable of cross-linking the polymer; and finally adjusting the pH of the colloid to approximately physiological conditions. This is preferred because it maximizes the amount of polyamine adsorbed to the particle surfaces and the cross-linking prevents de-adsorption of the polyamine in physiological conditions.

The following examples illustrate the practice of this invention. They are not intended to be exhaustive of all possible variations of the invention. Parts and percentages are by weight unless otherwise indicated.

EXAMPLES

Silica colloids were purchased from Nalco Chemical Company and are Nalco 1130, mean particle diameter of 8 nm, 30% solids, pH=10.0, specific surface area=375 g/m$^2$; Nalco 1140, mean particle diameter of 15 nm, 40% solids, pH=9.7, specific surface area=200 g/m$^2$; Nalco 1050, mean particle diameter of 20 nm, 50% solids, pH=9.0, specific surface area=150 g/m$^2$; Nalco 2329, mean particle diameter of 90 nm, 40% solids, pH=10.0, specific surface area=40 g/m$^2$. Polyethyleneimines were purchased from Aldrich Chemicals and are average MW=2000 g/mol, 46.5 monomers/mol polymer; average MW=10,000 g/mol, 233 monomers/mol polymer) and average MW=60,000 g/mol, 1,395 monomers/mol polymer. The monomer molecular weight for polyethyleneimine (hereafter "PEI") was taken to be 43.0 g/mol. BVSM is bis-ethene, 1,1'-[methylenebis(sulfonyl)] as was obtained from Eastman Kodak Company. PBS (phosphate buffer system) buffer was prepared by dissolving: 137 mM NaCl (8 g), 2.7 mM KCl (0.2 g), 10 mM Na$_2$HPO$_4$ (1.44 g), 2 mM KH$_2$PO$_4$ (0.24 g) in 1.0 L distilled water.

Core-shell colloidal dispersions were prepared by the simultaneous addition of the core and the shell colloidal dispersions into a highly efficient mixing apparatus. The colloidal dispersions were introduced via calibrated peristaltic pumps at known flow rates. The mixing efficiencies and flow rates were varied to obtain stable core/shell colloidal dispersions. The details of the preparation and the characteristics of the dispersions are given below. The mixing efficiency of the apparatus is described by the turnover rate, where the turnover rate=(stir rate(rev/min)×turnover volume (ml/rev)) divided by the aqueous volume. The mixing efficiency typically was kept constant for each example and was about 25 turnovers/min, or 0.4 turnovers/sec. Particle size determination. The volume-weighted, mean particle size diameters of the core-shell nanoparticulate carriers obtained in the following examples were measured by a dynamic light scattering method using a MICROTRAC® Ultrafine Particle Analyzer (UPA) Model 150 from Leeds & Northrop. The analysis provides percentile data that show the percentage of the volume of the particles that is smaller than the indicated size. The 50 percentile is known as the median diameter, which is referred herein as "median particle size diameter". The "volume-weighted mean particle size diameter" is calculated from the area distribution of the particle size as described in the MICROTRAC® Ultrafine Particle Analyzer (UPA) Model 150 manual. The standard deviation describes the width of the particle size distribution. The smaller the standard deviation the narrower the width of the particle size distribution.

Quantitative determination of polymer adsorption. Solution State NMR spectroscopy was used as a quantitative method to determine the amount of PEI adsorbed onto the colloidal nanoparticles. This is possible since it is known that polymers adsorbed to a particle surface show reduced mobility and are also subject to changes in magnetic susceptibility. Both of these factors lead to substantially increased linewidths of the NMR resonances resulting from polymeric material associated with particle surfaces. The dramatic increase in line-width results in an inability to observe the resonances for polymeric materials associated with the surface of the particle, and observed NMR resonances arise only from polymer free in solution. The NMR resonances of the core-shell colloids of the examples were compared to an external standard containing a known amount of dissolved (free) PEI. The relative integration of the resonances, were then utilized to determine the concentration of free PEI, and the percent PEI adsorbed to the particle was determined by difference.

Controlled Simultaneous Assembly:

Comparative examples have the designation "C". Examples of the invention have the designation "I".

C-1: Into a 1.0 L container containing 200 ml of distilled water which was stirred with a prop-like stirrer at a rate of about 2000 rpm was simultaneously added 200 g of a 40% (w/w) silica colloid core particle (Nalco 2329-90 nm) at a rate of 20.00 ml/min., and 27.5 g of a 10% (w/w) solution of polyethyleneimine (PEI, MW=2000 g/mol) at 3.0 ml/min., each for about 9 minutes. A 1.0 N solution of nitric acid was also simultaneously added at a rate necessary to keep the pH maintained at, or near, pH 10.0. The addition rates were controlled using calibrated peristaltic pumps. The rates were set as to keep the ratio of PEI to surface area of silica at a constant 20 umol monomer/m2. The final concentration of the resulting core-shell colloid was calculated to be 19% solids; the mean particle size diameter and the physical characteristics are given in Table 1.

C-2: Performed in an identical manner to that of C-1 except that the 1.0 N solution of nitric acid was simultaneously added at a rate necessary to keep the pH maintained at, or near, pH 9.0. The mean particle size diameter and the physical characteristics are given in Table 1.

C-3: Performed in an identical manner to that of C-1 except that the 1.0 N solution of nitric acid was simultaneously added at a rate necessary to keep the pH maintained at, or near, pH 8.0. The mean particle size diameter and the physical characteristics are given in Table 1.

C-4: Performed in an identical manner to that of C-1 except that the 1.0 N solution of nitric acid was simultaneously added at a rate necessary to keep the pH maintained at, or near, pH 7.0. The mean particle size diameter and the physical characteristics are given in Table 1.

I-1: Performed in an identical manner to that of C-1 except that the 1.0 N solution of nitric acid was simultaneously added at a rate necessary to keep the pH maintained at, or near, pH 6.0. The mean particle size diameter and the physical characteristics are given in Table 1 and in FIG. 1.

I-2: Performed in an identical manner to that of C-1 except that the 1.0 N solution of nitric acid was simultaneously added at a rate necessary to keep the pH maintained at, or near, pH 5.0. The mean particle size diameter and the physical characteristics are given in Table 1 and in FIG. 1.

I-3: Into a 3.0 L container containing 200 ml of distilled water which was stirred with a prop-like stirrer at a rate of about 2000 rpm was simultaneously added 1,548.0 g of a 40% (w/w) silica colloid core particle (Nalco 2329-90 nm) at a rate of 40.00 ml/min., and 213.0 g of a 10% (w/w) solution of polyethyleneimine (PEI, MW=2000 g/mol), which was adjusted to pH 5.0 with nitric acid, at a rate of 5.2 ml/min., each for 30 minutes. A 1.0 N solution of nitric acid was also simultaneously added at a rate necessary to keep the pH maintained at, or near, pH 5.0. The addition rates were controlled using calibrated peristaltic pumps. The rates were set as to keep the ratio of PEI to surface area of silica at a constant 20 umol monomer/m2. The final concentration of the resulting core-shell colloid was calculated to be 33.1% solids, and did not show visible signs of aggregation over a period of months.

TABLE 1

| Ex. or Comp. Ex. | PH | % solids | mean Particle Size diameter (nm) | standard deviation (nm) | Stable Colloid |
|---|---|---|---|---|---|
| C-1 | 10.0 | 19.1 | 1060 | 450 | No |
| C-2 | 9.0 | 18.8 | 240 | 500 | No |
| C-3 | 8.0 | 18.5 | 220 | 380 | No |
| C-4 | 7.0 | 18.4 | 220 | 380 | No |
| I-1 | 6.0 | 18.4 | 180 | 220 | Yes |
| I-2 | 5.0 | 17.8 | 130 | 70 | Yes |
| I-3 | 5.0 | 33.1 | 90 | 20 | Yes |

The data of Table 1 show the dependence of the controlled simultaneous assembly upon the pH conditions. If the pH of the method is substantially above about 6.0, considerable aggregation of the core-shell colloids is observed and stable colloids do not result. Note that the core-shell colloid made at pH 7.0 (C-4) is not stable while the inventive example at pH 6.0 (I-1) is stable. The large mean particle size diameter observed and high standard deviation are indicative of aggregation. The inventive examples, in comparison, have a smaller mean particle size diameter and smaller standard deviation and are stable colloids. The inventive examples also contain core-shell nanoparticulate carriers at a very high percentage of solids, and thus controlled simultaneous assembly represents an efficient and low-cost, synthetic route to core-shell colloids.

Effect of Cross-Linking: Improved Stabilization of Core-Shellcolloids Less than 50 nm.

I-4: Into a 1.0 L container containing 200 ml of distilled water which was stirred with a prop-like stirrer at a rate of about 2000 rpm was simultaneously added 200 g of a 10% (w/w) silica colloid core particle (Nalco 1140-15 nm) at a rate of 20.00 ml/min, and 19.5 g of a 10% (w/w) solution of polyethyleneimine (PEI, MW=2000 g/mol), which was adjusted to pH 5.0 with nitric acid, at a rate of 1.9 ml/min. Each component was added for 10 minutes. A 1.0 N solution of nitric acid was also simultaneously added at a rate sufficient to keep the pH maintained at, or near, pH 5.0. The addition rates were controlled using calibrated peristaltic pumps. The rates were set as to keep the ratio of PEI to surface area of silica at a constant 20 umol monomer/m$^2$. The surface area of the silica particles was taken to be approximately 200 m$^2$/g. The mean particle size diameter and the physical characteristics measured over time are given in Table 2.

I-5: Into a 1.0 L container containing 200 ml of distilled water which was stirred with a prop-like stirrer at a rate of about 2000 rpm was simultaneously added 200 g of the nanoparticle substrate prepared in example I-4 at a rate of 20.00 ml/min, and to cross-link the PEI formed on the particles, 59.7 g of a 0.45% solution of BVSM cross-linking reagent at 6 ml/min., each for 10 minutes. The addition rates were controlled using calibrated peristaltic pumps. The rates were set as to keep the ratio of BVSM/mole PEI polymer at a constant ratio of 3:1 (mol:mol). The mean particle size diameter and the physical characteristics measured over time are given in Table 2.

TABLE 2

| Ex. or Comp. Ex. | Cross-linking | mean Particle Size diameter (nm) | standard deviation (nm) | Stability (observations) |
|---|---|---|---|---|
| I-4 | No | day 1 = 24<br>day 4 = 34 | day 1 = 8<br>day 4 = 19 | became cloudy over weeks |
| I-5 | Yes | day 1 = 20<br>day 4 = 21 | day 1 = 9<br>day 4 = 9 | stable colloid over weeks |

The data of Table 2 indicate that for core-shell colloids of very small size (less than about 50 nm), the resulting colloid, while stable initially, may become unstable after weeks. The appearance of a cloudy solution is often indicative of colloid instability. In comparison, the cross-linked colloid is improved and shows stability over many weeks. The results become more evident when comparing the mean particle size diameter and the standard deviations of the particle size distributions (measured over time) of the two examples, respectively. The colloid having particles with the uncrosslinked polymer shell shows a transition toward a larger particle diameter and a larger standard deviation over time. The larger standard deviation indicates a broader particle size distribution and is consistent with the aggregation (cloudiness) observed for this sample. The core-shell colloid having particles with a cross-linked polymer shell shows no change in particle diameter and in size distribution over time, indicating that the colloid stability is improved.

Stabilization in Physiological Conditions.

Comparison Example (C-5): Into a 1.0 L container containing 200 ml of distilled water which was stirred with a prop-like stirrer at a rate of about 2000 rpm was simultaneously added 200 g of a 10% (w/w) silica colloid core particle (Nalco 1140-15 nm) at a rate of 20.00 ml/min, and 17.2 g of a 10% (w/w) solution of polyethyleneimine (PEI, MW=10,000 g/mol) at a rate of 1.7 ml/min, each for 10 minutes. A 1.0 N solution of nitric acid was also simultaneously added at a rate necessary to keep the pH maintained at, or near, pH 5.0. The addition rates were controlled using calibrated peristaltic pumps. The rates were set as to keep the ratio of PEI to surface area of silica at a constant 10 umol monomer/m$^2$. The surface area of the silica particles was taken as 200 m$^2$/g. At the end of the addition, the PEI surface modification was cross-linked through the addition of 3.75 g of a 1.8% BVSM solution added at a rate of 1.25 ml/min. The ratio of BVSM/mole PEI polymer was 2:1 (mol:mol). After cross-linking the samples were allowed to stand over several days, an aliquot of the above sample was adjusted to pH 7.4 and then solid NaCl was added to bring the salt concentration to 0.135 M. The sample immediately became cloudy and was not a stable colloid. The mean particle size diameter and the physical characteristics are given in Table 3.

I-6: Performed in an identical manner to that of C-5 except that the rates were set as to keep the ratio of PEI to surface area of silica at a constant 20 umol monomer/m$^2$. The final concentration of core-shell colloid was about 5.0% solids. The mean particle size diameter and the physical characteristics are given in Table 3.

I-7: Performed in an identical manner to that of C-7 except that the rates were set as to keep the ratio of PEI to surface area of silica at a constant 30 umol monomer/m$^2$. The final concentration of core-shell colloid was about 5.0% solids. The mean particle size diameter and the physical characteristics are given in Table 3.

TABLE 3

| Ex. or Comp. Ex. | Ratio PEI/colloid surface area (μmol/m$^2$) | mean Particle Size diameter (nm) @ pH 5, no salt | standard deviation (nm) @ pH 5, no salt | mean Particle Size diameter (nm) @ pH 7.4, 0.135 M NaCl | standard deviation (nm) @ pH 7.4, 0.135 M NaCl | Stable Colloid at pH 7.4, 0.135 M NaCl |
|---|---|---|---|---|---|---|
| C-5 | 10 | 26 | 14 | 2300 | 1640 | No |
| I-6 | 20 | 23 | 10 | 29 | 12 | Yes |
| I-7 | 30 | 26 | 9 | 22 | 12 | Yes |

The data of Table 3 indicate that stabilization of the inventive core-shell nanoparticulate carriers in physiological conditions requires a shelling rate of greater than 10 umol/m$^2$ silica surface.

Inventive Example (I-8): Into a 1.0 L container containing 200 ml of distilled water which was stirred with a prop-like stirrer at a rate of about 2000 rpm was simultaneously added 200 g of a 10% (w/w) silica colloid core particle (Nalco 1140-15 nm) at a rate of 20.00 ml/min, and 17.2 g of a 10% (w/w) solution of polyethyleneimine (PEI, MW=10,000 g/mol) at a rate of 3.1 ml/min, each for 10 minutes. A 1.0 N solution of nitric acid was also simultaneously added at a rate sufficient to keep the pH maintained at, or near, pH 5.0. The addition rates were controlled using calibrated peristaltic pumps. The rates were set as to keep the ratio of PEI to surface area of silica at a constant 18 umol monomer/m$^2$. The surface area of the silica particles was taken as 200 m$^2$/g. The resulting colloid had a particle size of 24 nm, a narrow distribution width, and was colloidally stable over a period of months.

Inventive Example (I-9): The polyamine modified particles of example I-8 were adjusted to pH 7.0 with the addition of 1.0 N NaOH.

Inventive Example (I-10): The polyamine modified particles of example I-8 were adjusted to pH 9.0 with the addition of 1.0 N NaOH.

Inventive Example (I-11): The polyamine modified particles of example I-10 were adjusted back to pH 5.0 with the addition of 1.0 N HNO$_3$.

Inventive Example (I-12): The polyamine modified particles of example I-10 were adjusted back to pH 7.0 with the addition of 1.0 N HNO$_3$.

Inventive Example (I-13): The polyamine modified particles of example I-10 were crosslinked at pH 9.0 by the addition of a 1.8% BVSM solution added at a rate of 1.25 ml/min. The ratio of BVSM/mole PEI polymer was 8:1 (mol:mol).

Inventive Example (I-14: The polyamine modified particles of I-13 were adjusted to pH 7.0 with the addition of 1.0 N HNO$_3$.

Inventive Example (I-15): The polyamine modified particles of I-13 were adjusted to pH 7.4, NaCl was added to give a concentration of 137 mM and the sample was diluted 1:1 with PBS buffer.

The percentage of polymer absorbed for inventive examples I-8 through I-15 were measured as described above; and are reported in Table 3A.

TABLE 3A

| Ex. or Comp. Ex. | PH of measurement | % polyamine adsorbed | Remarks |
| --- | --- | --- | --- |
| I-8  | 5.0 | 33 | |
| I-9  | 7.0 | 56 | |
| I-10 | 9.0 | 78 | |
| I-11 | 5.0 | 40 | sample C-8 readjusted back to pH 5 |
| I-12 | 7.0 | 56 | sample C-8 readjusted back to pH 7 |
| I-13 | 9.0 | 78 | Cross-linking at pH 9.0 |
| I-14 | 7.0 | 70 | sample I-8 readjusted back to pH 7 |
| I-15 | 7.4 | 75 | sample 1-8 readjusted to pH 7.4, and diluted 1:1 with PBS buffer |

The data of Table 3A indicate that the amount of adsorbed polyamine increases as the pH increases (and decreases as the pH decreases), see I-8 through I-10. However, as it was shown in Table 1, stable colloids having a narrow particle size distribution cannot be directly obtained at high pH values, but only below pH about 6.0 or 7.0. The data indicate the difficulty to directly simultaneously assemble a polyamine-modified core-shell colloid having both a high fraction of adsorbed polymer and having excellent colloidal stability. Furthermore, if the pH of the colloid is adjusted after assembly, polyamine adsorption increases but the polyamine deadsorbs if the pH is adjusted back to a lower value; see examples I-11 and I-12. Alternatively, we show an optimization of the method in which polyamine modified nanoparticles, having been assembled at low pH and subsequently cross-linked at high pH, have a high-degree of adsorbed polyamine, which remains adsorbed when adjusted back to physiological pH, and are stable colloids in physiological conditions I-14 and I-15.

The invention has been described in detail with particular reference to certain preferred embodiments thereof, but it will be understood that variations and modifications can be effected within the spirit and scope of the invention.

What is claimed is:

1. A method of making a composition comprising a colloid which is stable under physiological pH and ionic strength, said colloid comprising particles having a colloidal silica core and a shell, said method comprising the steps of:
    introducing into a vessel a first liquid stream containing core particles; simultaneously introducing into said vessel a second liquid stream containing a polymer made from a monomer having amine functionalities in an amount at least equal to the amount required to cover the surfaces of the core particles; and
    simultaneously introducing into said vessel a third liquid stream having a pH adjusting substance at such a rate that the pH in said vessel is maintained at a pH below 6.0, and
    subsequently readjusting the pH of the core-shell colloid to a pH between about 7-10; followed by the addition of a cross-linking reagent capable of cross-linking the polymer; and finally adjusting the pH of the colloid to approximately physiological conditions wherein the core-shell colloid contains between 10 and 30 µmol amine-monomer/m$^2$ core surface area.

2. The method of claim 1 wherein said polymer made from said monomer having amine functionalities comprises poly(ethylene)imine.

3. The method of claim 1 wherein the physiological conditions are pH 7.4 in 137 mM NaCl.

4. The method of claim 1 wherein the average particle size diameter of said core particles is between 1 and 500 nm.

5. The method of claim 1 wherein said polymer made from said monomer having amine functionalities is selected from the group consisting of poly(ethylene)imine, polyallylamine, chitosan, gelatin, amino-dextran, proteins, polypeptides and polylysine.

6. The method of claim 1 wherein said core-shell colloid is stable in salt solution having a concentration between about 30 mM to about 600 mM.

7. The method of claim 1 wherein greater than 70% of said polymer made from said monomer having amine functionalities is bound to said core.

8. The method of claim 1 wherein the core-shell colloid contains between 300 and 6000 µmol amine-monomer/g core particles.

9. The method of claim 1 wherein the average particle size diameter of said core particles is between 10 and 100 nm.

10. The method of claim 1 wherein said first, second and third liquid streams are brought together in a high shear mixing zone within a dispersion medium.

11. The method of claim 10 wherein said high shear mixing zone has a turnover rate of greater than 0.1 turnovers/sec.

* * * * *